(12) United States Patent
Attina et al.

(10) Patent No.: US 8,083,407 B2
(45) Date of Patent: Dec. 27, 2011

(54) SHIELDING DEVICE FOR OPTICAL AND/OR ELECTRONIC APPARATUSES, AND SPACE VEHICLE COMPRISING SUCH DEVICE

(75) Inventors: Primo Attina, Turin (IT); Enrico Domenico Bertuccio, Turin (IT); Luciana Bonino, Turin (IT)

(73) Assignee: Thales Alenia Space Italia SpA (IT)

( * ) Notice: Subject to any disclaimer, the term of this patent is extended or adjusted under 35 U.S.C. 154(b) by 119 days.

(21) Appl. No.: 12/512,177

(22) Filed: Jul. 30, 2009

(65) Prior Publication Data

US 2010/0034358 A1 Feb. 11, 2010

(30) Foreign Application Priority Data

Aug. 7, 2008 (EP) .................................... 08425546

(51) Int. Cl.
*H01J 35/16* (2006.01)
*G21K 1/02* (2006.01)
*G21K 3/00* (2006.01)
(52) U.S. Cl. .................. 378/203; 378/149; 378/158
(58) Field of Classification Search .................. 378/147, 378/149, 156–158, 193, 203, 204, 210; D16/130, D16/132, 136; 382/477, 817, 308, 723, 885, 382/361, 892
See application file for complete search history.

(56) References Cited

U.S. PATENT DOCUMENTS

| | | | | |
|---|---|---|---|---|
| 3,518,355 A * | 6/1970 | Luce | ............................ | 174/365 |
| 4,370,750 A * | 1/1983 | Hoover | ............................ | 378/43 |
| 4,562,583 A * | 12/1985 | Hoover et al. | .................. | 378/43 |
| 4,755,819 A * | 7/1988 | Bernasconi et al. | .......... | 343/915 |
| 5,044,579 A | 9/1991 | Bernasconi et al. | | |
| 5,345,238 A * | 9/1994 | Eldridge et al. | .................. | 342/3 |
| 6,024,458 A | 2/2000 | Lundgren | | |
| 6,118,579 A | 9/2000 | Endemann | | |
| 6,481,671 B1 * | 11/2002 | Blair | ............................ | 244/168 |
| 2004/0201896 A1 | 10/2004 | Lundgren et al. | | |
| 2004/0207566 A1 * | 10/2004 | Essig et al. | .................... | 343/878 |
| 2007/0278351 A1 | 12/2007 | Massonnet | | |

FOREIGN PATENT DOCUMENTS

| | | |
|---|---|---|
| DE | 213315 | 11/1908 |
| WO | WO 88/10211 A1 | 12/1988 |

* cited by examiner

*Primary Examiner* — Anastasia Midkiff
(74) *Attorney, Agent, or Firm* — Baker & Hostetler, LLP

(57) ABSTRACT

A shielding device (20) for optical and/or electronic apparatuses (16) is described, wherein said apparatuses may cooperate with incident electromagnetic radiation (X1, X2), in particular for space telescopes, the shielding device including:

at least a filter (24, 26) provided for interacting with said incident electromagnetic radiation (X1, X2), for selectively filtering said radiation; and a support structure (22) for the filter.

The support structure (22) is an inflatable structure, which is able to achieve an operating stand-by configuration, in which it is substantially folded together, and an active operating configuration, in which it extends along the longitudinal extension axis (ZZ), and is essentially completely unfolded. Furthermore, the filter (24, 26) includes a filter body, which is provided in order to be transversely positioned with respect to said longitudinal extension axis, when the support structure reaches its active operating configuration.

14 Claims, 5 Drawing Sheets

US 8,083,407 B2

SHIELDING DEVICE FOR OPTICAL AND/OR ELECTRONIC APPARATUSES, AND SPACE VEHICLE COMPRISING SUCH DEVICE

CROSS-REFERENCE TO RELATED APPLICATIONS

This application claims priority to foreign European Patent Application EP 08425546.2, filed Aug. 7, 2008, the disclosure of which is incorporated herein by reference in its entirety.

FIELD OF THE INVENTION

The present invention relates to a shielding device for optical and/or electronic apparatuses, in particular for space telescopes.

BACKGROUND OF THE INVENTION

In the technical field of space applications, there is an urgent need to selectively shield optical and/or electronic apparatuses from undesired electromagnetic radiation, wherein these apparatuses are carried on board of satellites or generally on board of space vehicles.

For example, in the particular field of space telescopes, during observation missions of scientific objectives, more and more often huge telescopes are used, called "Large Telescope", which are provided on board of satellites. The most recent development of optical telescopes on board of satellites foresees in particular an architecture based on two or more satellites operating within a formation. Telescopes of this type generally comprise a first satellite, called "Mirror Spacecraft", and a second satellite, called "Detector Spacecraft". The Mirror Spacecraft houses focusing devices and has to point these devices towards scientific objectives to be observed, whereas the Detector Spacecraft carries the detector, on which images are focused, which have then to be processed, stored and/or transmitted to earthbound stations.

In order to ensure adequate operation of such telescopes, it is necessary to provide a shielding device, for shielding the detector of the Detector Spacecraft from incident electromagnetic radiation, having a wavelength which is characteristic of sources at which the optics of Mirror Spacecraft are aimed, but which originate from sources, which are not aligned with the optics.

Shielding devices of the known art envisage the use of large cylindrical baffles, called "Shielding Baffle" or "Collimator", which are arranged on board the Detector Spacecraft, around the detector.

However, such shielding devices have some drawbacks.

Above said cylindrical baffles are in fact large monolithic structures, for instance including a core made of aluminum alloy and a cover made of carbon fiber composite material, which are characterized by high mass and considerable bulk. This is very important in the case of space applications, where an increase in mass with respect to payload causes a huge increase of costs and where available payload volume at launch generally represents a critical parameter.

SUMMARY OF THE INVENTION

An object of the present invention is to provide a shielding device for optical and/or electronic apparatuses, which is able to remove above said drawbacks, related to the known art.

This and other objects are achieved by using a shielding device for optical and/or electronic apparatuses, which may cooperate with incident electromagnetic radiation, in particular for space telescopes, the shielding device including at least a filter provided for interacting with said incident electromagnetic radiation, for selectively filtering said radiation; and a support structure for the filter; wherein the support structure is an inflatable structure, which is able to achieve an operating stand-by configuration, in which it is substantially folded together, and an active operating configuration, in which it extends along a longitudinal extension axis and is essentially completely unfolded, the filter moreover including a filter body, which is provided in order to be transversely positioned with respect to said longitudinal extension axis, when the support structure reaches its active operating configuration.

Another object of the present invention is a space vehicle including a shielding device described in the previous paragraph, and, in a particular embodiment, wherein said vehicle is a satellite including a space telescope.

BRIEF DESCRIPTION OF THE DRAWINGS

The invention will be more clearly understood in the following detailed description, of some of its embodiments, which are provided as non limiting examples, with reference to appended drawings, wherein.

DETAILED DESCRIPTION OF THE INVENTION

Figure 1:
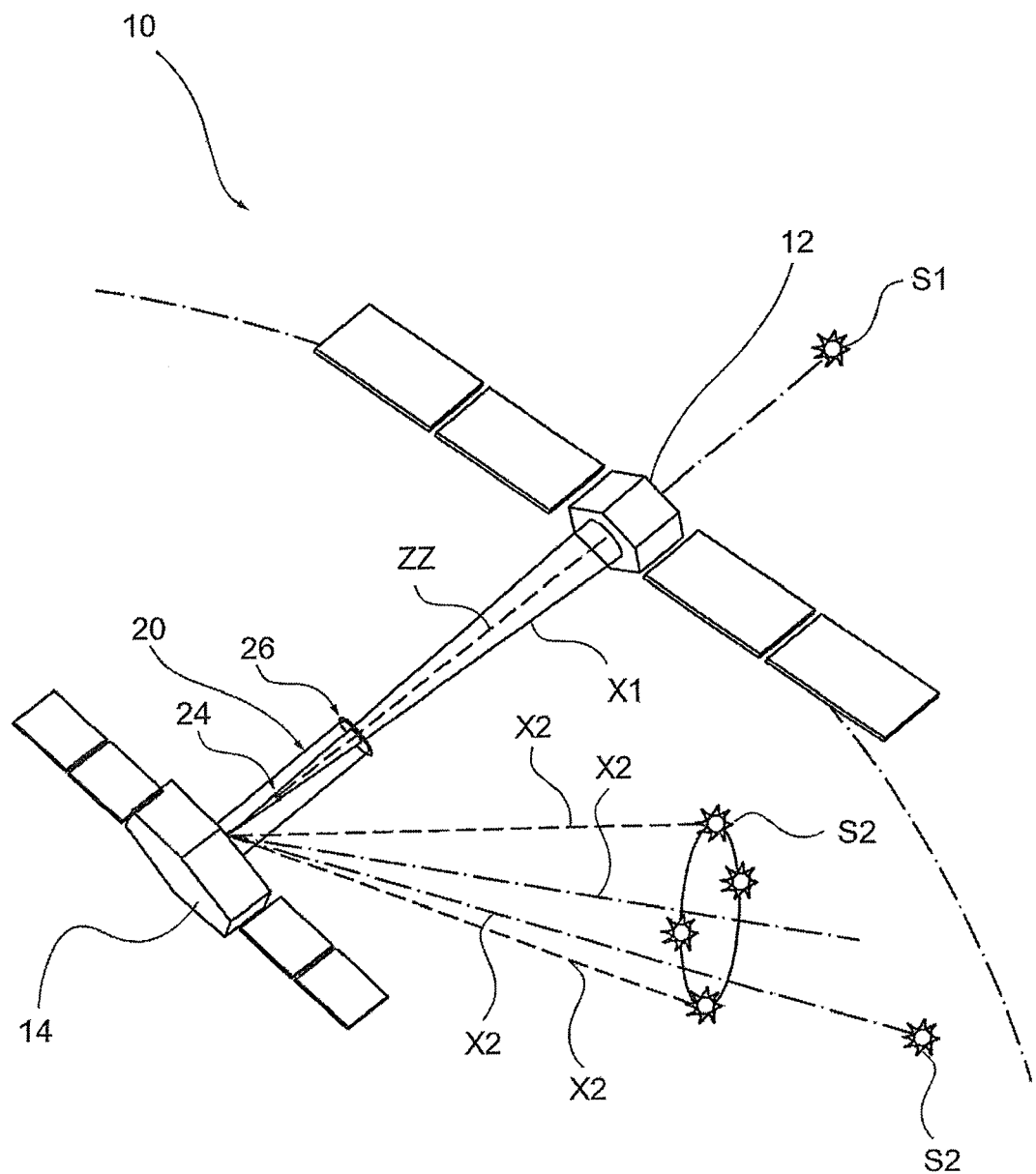
FIG. 1 shows a perspective view of a space telescope comprised of two space vehicles which orbit in a formation, wherein the telescope comprises a shielding device according to a presently preferred embodiment of the present invention.

In the drawings, same or similar elements are indicated by same numeral references.

With reference to FIG. 1, 10 generally indicates a space telescope, in this example, a telescope for observing X-ray sources, including a pair of space vehicles, which may operate in a formation. More in particular, the pair 10 of space vehicles respectively comprises a Mirror Spacecraft 12 or MSC and a Detector Spacecraft 14 or DSC. The MSC carries on board focusing devices and observation optics, such as special mirrors or other types of optics, which are called "mirrors" in the following, and orients them towards the scientific objectives to be observed, such as a celestial body S1. The DSC carries on board an optoelectronic apparatus 16 or detector (schematically shown in FIG. 6), on which images are focused, which may then be processed, stored and/or transmitted to earthbound stations.

More in particular, in the present example, the detector 16 comprises a plurality of optoelectronic sensors (not shown in figures), which may cooperate with incident electromagnetic radiation X1, X2 (FIG. 1), i.e. electromagnetic radiation which is generally within the nominal field of view of detector 16. The field of view of detector generally is the solid angle in the sky visible by detector. In the present example, without shielding devices, the nominal field of view is in particular of hemispherical shape, i.e. it is substantially equal to one half of the sky.

With reference to FIG. 1, on board the DSC a shielding device 20 according to a currently preferred embodiment of the present invention is provided. The shielding device 20 has to selectively shield the detector from incident electromagnetic radiation X1, X2, so that detector 16 is almost exclusively struck by incident electromagnetic radiation originating from the source, which is aimed at by the telescope, i.e. desired radiation X1. In this example, this desired radiation is coming from MSC 12. In other words, shielding device 20 is capable of shielding the detector 16 from incident electromagnetic radiation coming from sources, which are different with respect to the one, which is aimed at by the telescope, i.e. the undesired radiation X2. In this particular case, regarding an X-ray telescope, this undesired radiation comprises for example incident electromagnetic radiation coming from X-ray sources, such as celestial bodies S2, which are not the one at which the telescope is aiming.

Figure 4:
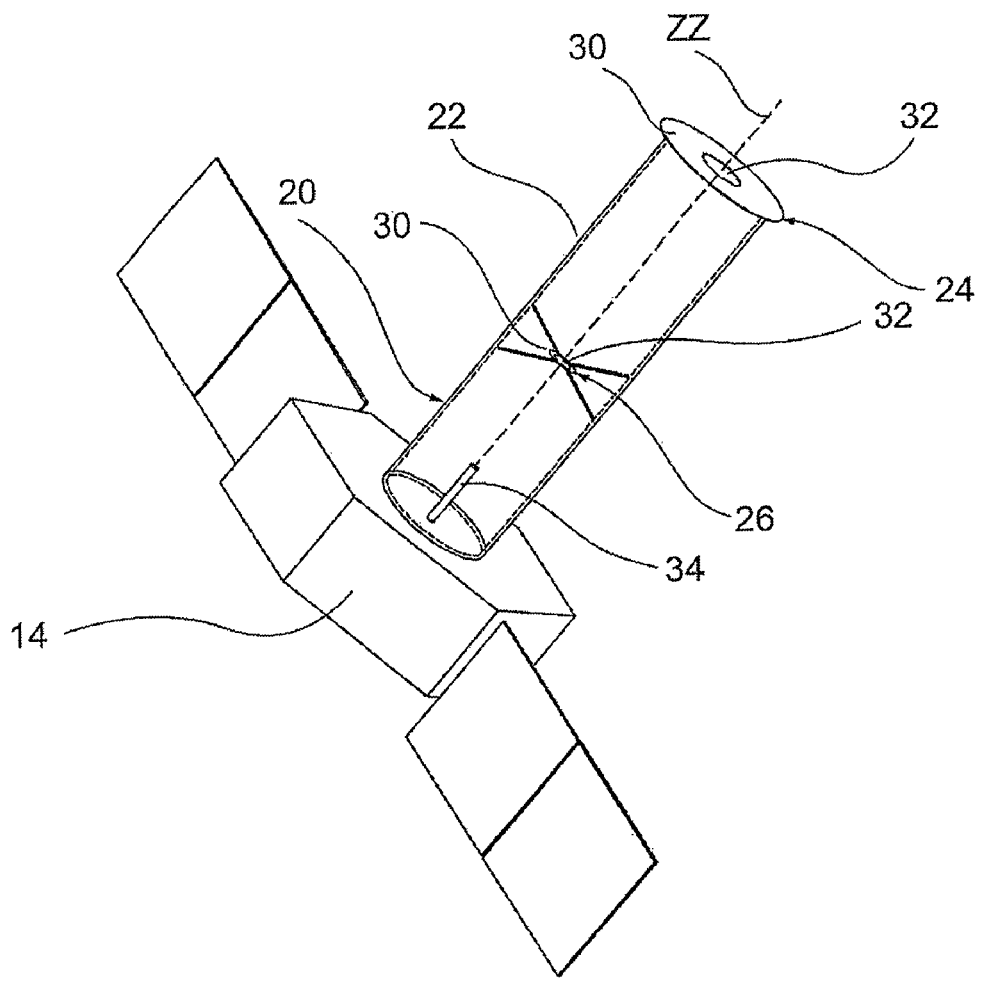
FIG. 4 shows a perspective view of space vehicle shown in FIG. 2, wherein the shielding device is shown in a third operating configuration.

With reference to FIG. 4, shielding device 20 comprises a support structure 22, for supporting at least a shielding element or filter 24, 26, which is capable of cooperating with at least a portion of incident electromagnetic radiation.

Advantageously, support structure 22 is an extensible structure, and more in particular, an inflatable structure. The structure 22 is able to achieve a stand-by operating configuration (FIG. 2), in which it is essentially folded together, and an active operating configuration (FIG. 4), in which it is essentially completely unfolded. In other words, the structure 22 is able to achieve a stand-by operating configuration, in which it is essentially deflated and compacted, and an active operating configuration, in which it is essentially completely inflated and extends along the longitudinal axis ZZ. Inflation of support structure is achieved, for example by means of a gas, by using a known pressurizing device.

From now on, when not otherwise stated, it is implied that the support structure 20 is in the active operating condition.

According to an advantageous embodiment, support structure 22 has a tubular shape, in this example a cylindrical shape, which extends around above said longitudinal extension axis ZZ. This axis, in the present example, is in particular coincident with focal axis ZZ of telescope 10.

Figure 5:
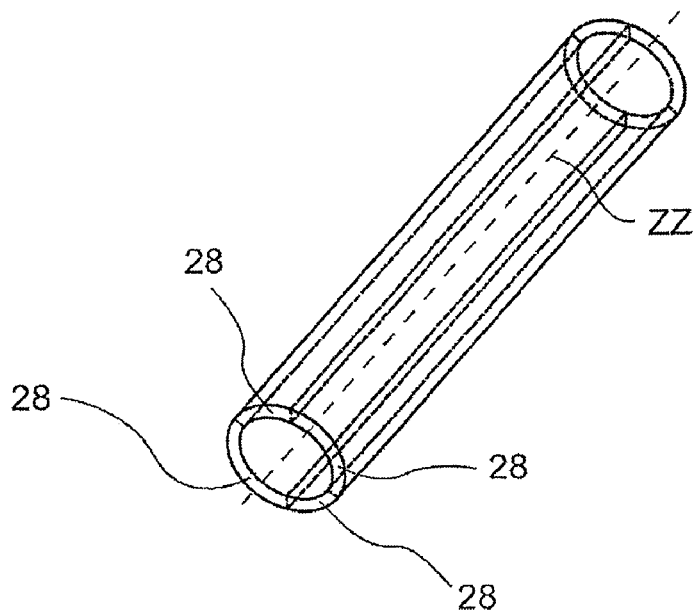
FIG. 5 shows a perspective view of a component of shielding device of FIG. 1, wherein the structure of this component is schematically shown.

With reference to FIG. 5, in which a particularly advantageous embodiment of support structure 20 is schematically shown, this structure has a segmented structure, including a plurality of inflatable chambers 28, which are positioned, according to a contiguous arrangement, about the focal axis ZZ. In the embodiment of FIG. 5, inflatable chambers 28 are longitudinally extensible chambers, which preferably extend along the whole length of support structure. Such segmented structure advantageously allows an increase of bending rigidity of inflatable structure. According to an alternate embodiment, structure 22 may however be provided in another way, for example in order to provide only one inflatable chamber.

Still referring to FIG. 4, shielding device 20 comprises a plurality of filters 24, 26, which may interact with at least a portion of incident electromagnetic radiation, in order to selectively filter this radiation. In the embodiment shown, filters 24, 26 are capable of filtering incident electromagnetic radiation according to its inclination with respect to focal axis ZZ of telescope, i.e. according to respective incident angles with said axis.

According to an embodiment of the invention, filters 24, 26 each comprise a substantially plate-like filter body, to be transversely positioned with respect to focal axis ZZ, when the support structure 20 reaches the active operating configuration. In particular, in the appended figures, filters 24, 26 are rigid plates, which are perpendicular to focal axis of telescope.

In the example shown, filters 24, 26 are made of a material which is opaque to X-rays, i.e. it is substantially not transparent with respect to the wavelength of such radiation, and does not emit secondary radiation, when struck by X-rays. Filters 24, 26 may for example be made of aluminum with an external protective layer made of carbon, or they may be honeycomb structures, made of aluminum and carbon or aluminum with a protective multilayer, including for example tantalum, tin, copper, aluminum and carbon.

According to an embodiment, each filter body comprises a shielding portion, which in the example shown, is shaped like a shielding annulus 30, and a pass-through portion, which, in the example shown, is a pass-through aperture 32, surrounded by the shielding annulus. In other words, in the present example, wherein the shielding portions are annuluses, pass-through apertures 32 are circular apertures.

Pass-through apertures 32 are each capable of letting incident electromagnetic radiation pass through, having incident angles within a respective first incident angle range. Shielding annuluses 30 may each shield the detector 16 (FIG. 6) from incident electromagnetic radiation having incident angles within a respective second incident angle range, which is distinct from first range. More in particular, shielding annuluses may shield from incident electromagnetic radiation having incident angles greater than incident angles of electromagnetic radiation passing through respective pass-through apertures.

According to an embodiment, when the support structure is in the active operating configuration, the filters are aligned and mutually separated by predefined distances, along focal axis ZZ of telescope. In particular, in the embodiment shown in figures, filters 24, 26 are centered with respect to focal axis ZZ.

According to a particularly advantageous embodiment, pass-through apertures 32 have dimensions transversal to focal axis ZZ, which decrease when distance between filters and detector 16 diminishes. When the size of pass-through apertures 32 is reduced, respective shielding annuluses 30 may shield the detector 16 from incident radiation forming incident angles, which increase with respect to focal axis. Preferably, also external diameter of shielding annuluses 30 decreases with a reduction of distance between filters and detector.

According to a particularly advantageous embodiment, the supporting structure may be impregnated with a polymer resin, which may polymerize when exposed to solar radiation, in order to further stiffen the supporting structure. This allows an increase of rigidity of support structure, so that filters 24, 26 may be kept in the correct position even during maneuvers of DSC 14.

A further advantage obtained with polymer resin is that it preserves the rigidity of support structure 22 even if the inflatable chambers 28 are damaged, for instance in case of loss of pressure due to perforation by small meteorites.

Figure 6:
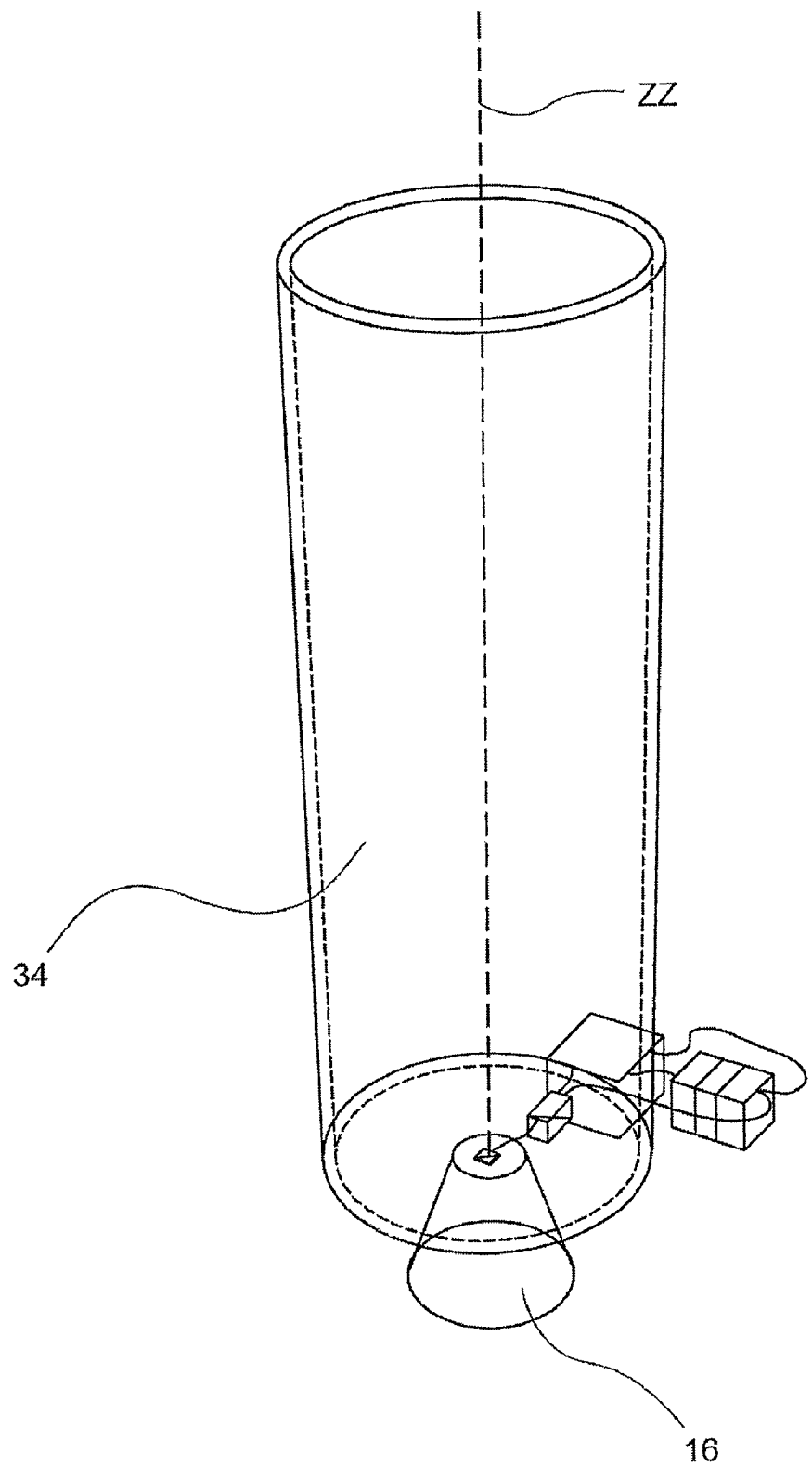
FIG. 6 shows a perspective view, wherein a component of shielding device of FIG. 1 is shown in greater detail, this component being visible in FIG. 2.

According to an advantageous embodiment, shielding device 20 comprises a fixed baffle 34, which is provided at or near the focal plane of detector (FIG. 6).

Such a baffle is provided for shielding the detector from incident radiation having incident angles so high, that it cannot be shielded by shielding annuluses 30.

According to an embodiment, the fixed baffle 34 is a tubular rigid baffle, which extends around focal axis ZZ of telescope. Advantageously, the rigid baffle 34 extends inside the support structure. In other words, in this example, wherein the support structure is of cylindrical tubular shape, the fixed baffle is completely housed within the cavity formed by internal walls of cylinder. In the embodiment shown in figures, the fixed baffle 34 advantageously has dimensions, transversal to focal axis ZZ, which are less than those of pass-through apertures 32 of filters 24, 26. In this manner, the fixed baffle may pass through apertures, when support structure 22 goes from stand-by configuration to the active operating configuration, and vice versa.

An example of operation of shielding device 20 is described in the following, according to an embodiment of the present invention.

Figure 2:
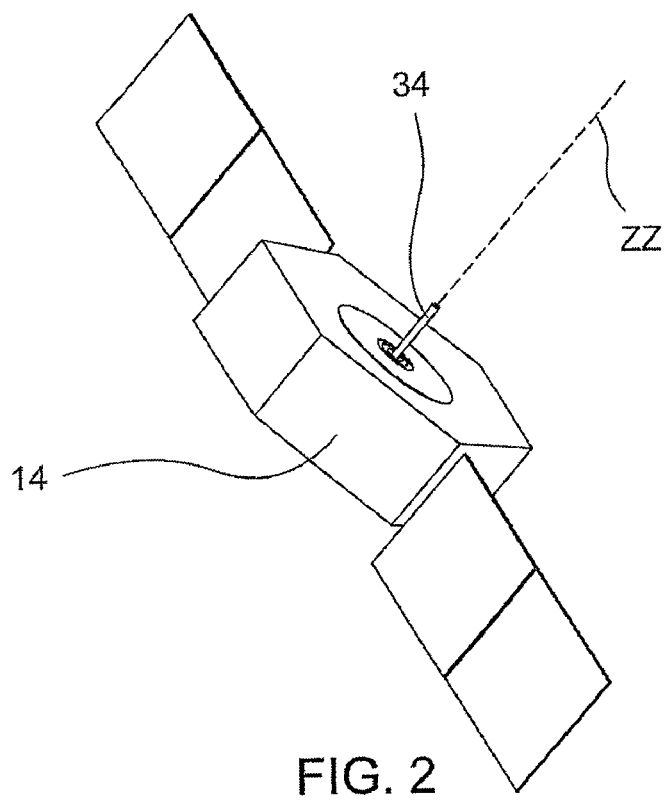
FIG. 2 shows a perspective view of one among two space vehicles of FIG. 1, including the shielding device shown in FIG. 1, in a first operating configuration.
Figure 3:
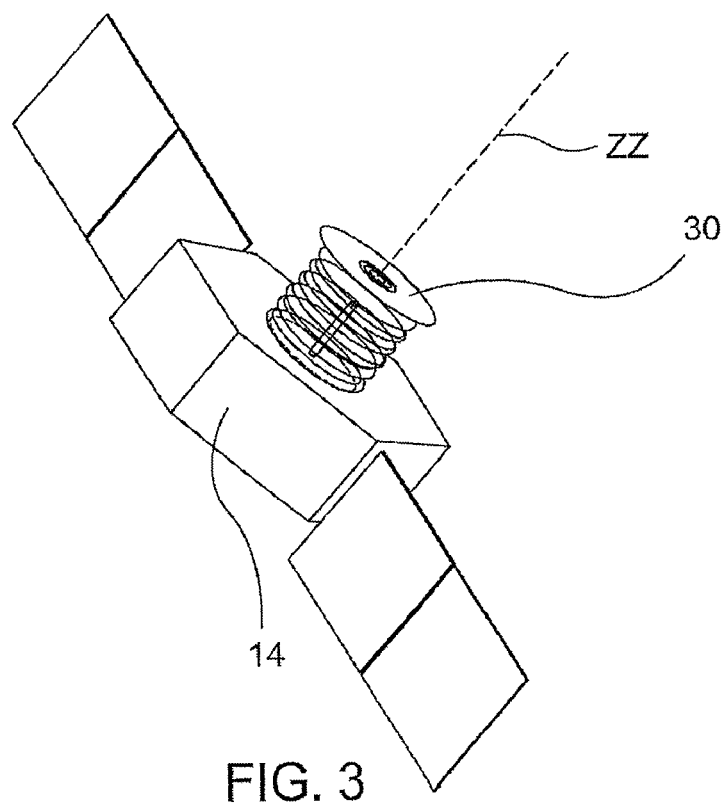
FIG. 3 shows a perspective view of a space vehicle shown in FIG. 2, wherein the shielding device is shown in a second operating configuration.

Initially, and during the whole launch phase, the support structure is in the stand-by configuration. In particular, this structure is folded together with filters 24, 26, preferably at base of fixed baffle 34 (FIG. 2). Once the space telescope has reached its orbit, the support structure is inflated by the pressurizing device, in order to achieve its active operating configuration.

Figure 7:
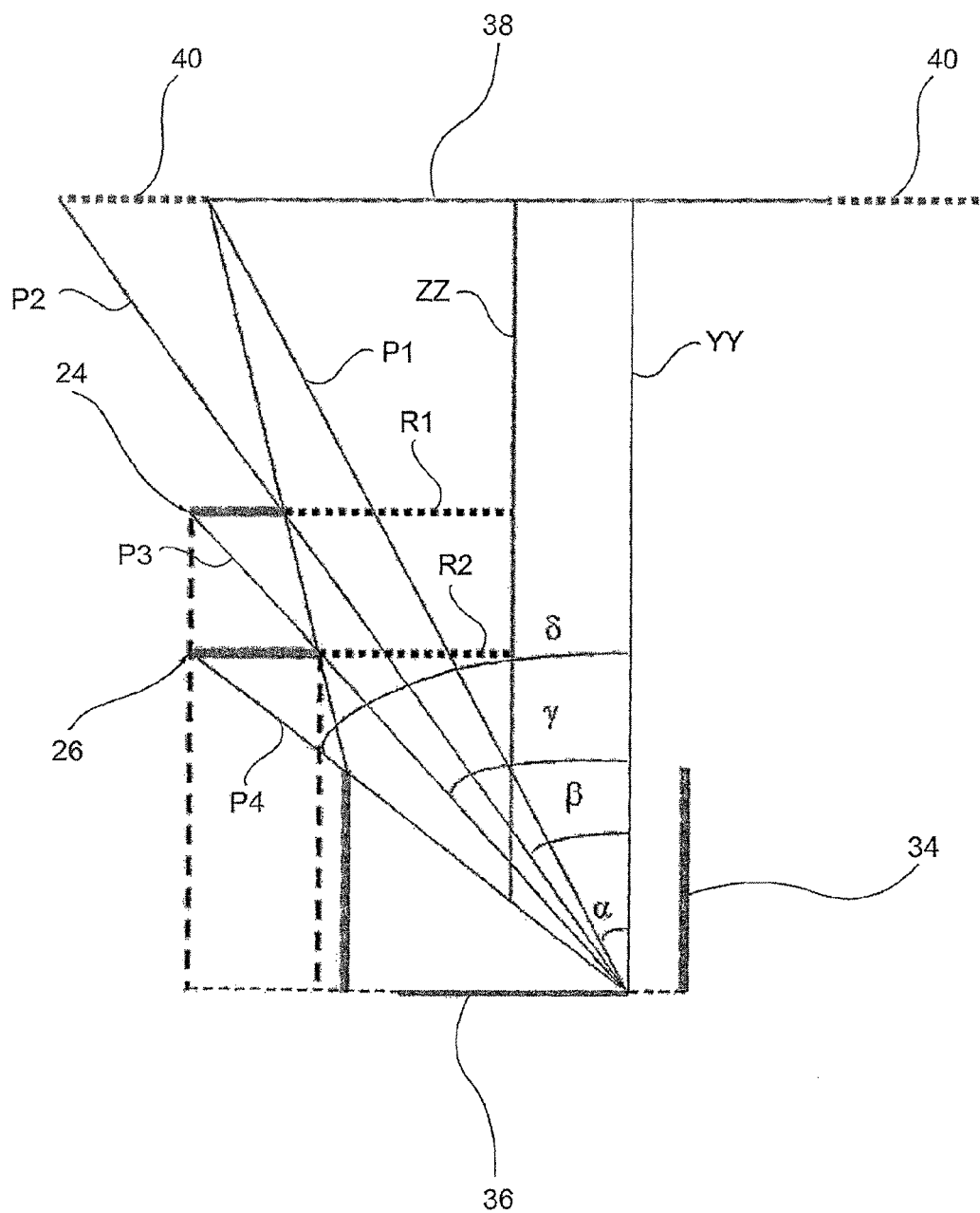
FIG. 7 shows a transversal section, wherein the telescope of FIG. 1 is schematically shown and operation of shielding device of FIG. 1 is schematically illustrated.

For a better understanding of operation of shielding device 20, reference should be made to FIG. 7. In this figure, a geometric transversal section of shielding device 20 is schematically shown, with the exception of support structure 22, according to a currently preferred embodiment of present invention. In this figure, in particular, focal plane 36 of detector 16, fixed baffle 34, and two filters 24, 26 are shown, wherein the latter are only partially shown for sake of simplicity. With reference to same figure, at a distance from focal plane of detector, which is equal to focal length of telescope 10, in this example approx. 20 (m), the mirror 38, which is provided on board the MSC 12 and an additional shielding element or filter 40, called "mirror skirt", are schematically shown. The mirror skirt is analogous to filters 24, 26, and is provided on MSC around mirror 38, in order to shield it from a first portion of incident electromagnetic radiation.

FIG. 7 also shows a plurality of limit incident angles $\alpha$, $\beta$, $\gamma$, $\delta$, which are respectively defined between some reference directions P1, P2, P3, P4 and focal axis ZZ of detector. Above said reference directions are bound to geometry of shielding device and are particularly suitable for defining the shielding action of filters 24, 26, of mirror skirt 40 and fixed baffle 34. Limit angles $\alpha$, $\beta$, $\gamma$, $\delta$ of FIG. 7 are respectively in an increasing order, and for sake of clarity, are illustrated by reference to an axis YY, which is parallel to focal axis ZZ.

Still with reference to FIG. 7, it is to be noted that mirror skirt 40 may shield from a first portion of undesired radiation, and more particularly, radiation having incident angles between angles $\alpha$ and $\beta$. In a similar manner, filter 24, including pass-through aperture having a major radius R1, and filter 26, including pass-through aperture having minor radius R2, are capable of shielding from undesired radiation having incident angles between angles $\beta$ and $\gamma$ and angles $\gamma$ and $\delta$, respectively. Finally, incident radiation having incident angles greater than angle $\delta$ is blocked by fixed baffle 34. To summarize: mirror 40, filters 24, 26 and fixed baffle are capable of cooperating with incident electromagnetic radiation, so that the whole system substantially operates like a collimator, in order to allow only incident radiation with an incident angle less than angle $\alpha$ to reach focal plane 36 of detector 16.

Based on above description, one may understand that a shielding device of above said type is able to fully achieve intended goals, overcoming the drawbacks of devices of the known art.

The provision of a shielding device including plate-like filters and an inflatable support structure, provides a significant reduction of mass of shielding device with respect to solutions of known art, which use large monolithic cylinders.

Furthermore, the provision of an inflatable support structure allows a considerable reduction of bulk of shielding structure, in particular during launch phase, so that this device is rendered essentially compatible with any launch device. This is particularly important in the case of X-ray space telescopes. These telescopes would in fact require monolithic cylinders, of such a size as to be rendered incompatible even with respect to commonly used launchers, used for putting into orbit space telescopes.

According to a particularly advantageous embodiment, the shielding device according to the present invention is capable of shielding the detector also from optical radiation, such as solar radiation, reducing the need for, or even eliminating the need for particular optical filters, used in the known art for shielding detectors operating at X-ray wavelength, from solar radiation. This is particularly advantageous since in the case of low energy X-ray detectors, above said optical filters also attenuate the useful X radiation.

It is clear that modifications and/or variations may be introduced in the examples described and illustrated above.

According to an embodiment of the invention, both the support structure and the filters may be manufactured in alternate ways, with respect to above embodiments. For instance, the support structure may have a square sectional shape, whereas the filters may comprise square or generally polygonal shaped perforated plates. Filters may also be produced in order to provide pass-through portions, which are different from pass-through apertures. The pass-through portions may for example be made of materials substantially transparent with respect to desired electromagnetic radiation.

According to an embodiment, the filters may be provided in such a way to allow a frequency filtering instead of a spatial filtering.

In general, the number and size of filters may vary according to specific needs.

Anyway, it is to be noted that, in general, a shielding device according to the present invention may be employed also for shielding optical and/or electronic devices, which differ from optics of a space telescopes, for instance those used for protecting telecommunication devices or other instruments provided on board of satellites, space stations or spacecrafts in general. In particular, the shielding device may be advantageously used with optical and/or electronic apparatuses, which operate in the frequency range of X-rays and/or $\gamma$-rays.

The shielding device may be used for example also in fields, different from the specific space sector, for instance for aeronautical or terrestrial applications.

It is useful to note that, in the end, in case of non-optical devices, the focal axis corresponds to another equivalent reference axis, which is characteristic for such devices. For example, for an antenna, the focal axis corresponds to the pointing axis of the antenna.

What is claimed is:

1. Shielding device for optical and/or electronic apparatuses, which cooperates with incident electromagnetic radiation, the shielding device including:
    at least two filters for interacting with said incident electromagnetic radiation, for selectively filtering said radiation; and an inflatable support structure for the filter which is able to achieve an operating stand-by configuration, in which it is substantially folded together, and an active operating configuration, in which it extends along a longitudinal extension axis and is essentially completely unfolded; wherein each of the filters includes a filter body comprising a shielding portion and a pass-through portion, which is transversely positioned with respect to said longitudinal extension axis when the support structure reaches its active operating configuration;

wherein at least the pass-through portions of the filters have transversal dimensions, with respect to the longitudinal extension axis, said transversal dimensions decreasing with a decrease in distance between filters and optical and/or electronic apparatuses, the shielding portions of the filters shielding the incident electromagnetic radiation having incident angles increasing with a decrease in transversal dimensions of the pass-through portions.

2. Shielding device according to claim 1, wherein the incident electromagnetic radiation comprises radiation having a frequency within the frequency range from X-rays to γ-rays.

3. Shielding device according to claim 1, wherein said longitudinal extension axis coincides with the focal axis or pointing axis of said optical and/or electronic apparatuses.

4. Shielding device according to claim 1, wherein the incident electromagnetic radiation may form incident angles relative to said longitudinal extension axis, said incident angles being different from one another, the filters selectively filtering incident electromagnetic radiation according to respective incident angles.

5. Shielding device according to claim 1, wherein the each filter body is a substantially plate-like body;

a first portion of the incident electromagnetic radiation may pass through each pass-through portion, said first portion of the incident electromagnetic radiation having incident angles within a first range of the incident angles; and each shielding portion, shields said optical and/or electronic apparatuses from a second portion of the incident electromagnetic radiation, said second portion of the incident electromagnetic radiation having incident angles within a second range of the incident angles, said second range being distinct from said first range.

6. Shielding device according to claim 5, wherein the pass-through portion is a pass-through aperture, and wherein the shielding portion extends around said pass-through aperture.

7. Shielding device according to claim 1, including a plurality of filters, the filters being arranged in an aligned and mutually distanced way, according to predefined distances along said longitudinal extension axis, when the support structure reaches its active operating configuration.

8. Shielding device according to claim 1, wherein the support structure is a tubular structure, extending around said longitudinal extension axis, when in the active operating configuration.

9. Shielding device according to claim 1, wherein the support structure includes a plurality of inflatable chambers, which may achieve a longitudinal extension, and are arranged in a mutually contiguous manner around said longitudinal extension axis.

10. Shielding device according to claim 1, wherein said support structure comprises polymeric resins, which polymerize when exposed to solar radiation, in order to stiffen the support structure.

11. Shielding device according to claim 1, including a fixed baffle, which is provided at or near said optical and/or electronic apparatuses.

12. Shielding device according to claim 11, wherein the fixed baffle is a tubular rigid baffle, which extends around said longitudinal extension axis, said fixed baffle extending inside the support structure when said structure reaches the active operating configuration.

13. Space vehicle including a shielding device according to claim 1.

14. Space vehicle according to claim 13, wherein said vehicle is a satellite including a space telescope.

* * * * *